United States Patent Office 2,978,446
Patented Apr. 4, 1961

2,978,446

LEVEL-OFF D.P. CELLULOSE PRODUCTS

Orlando A. Battista, Drexel Hill, and Patricia A. Smith, Chester, Pa., assignors to American Viscose Corporation, Philadelphia, Pa., a corporation of Delaware No Drawing. Filed Jan. 28, 1957, Ser. No. 636,483

15 Claims. (Cl. 260—212)

This invention relates to level-off D.P. cellulose products and to a method of preparing such products.

In the study of the structure of cellulose, both native and regenerated, the cellulosic material has been hydrolyzed to remove amorphous cellulosic material and the cellulosic structure remaining, frequently termed crystalline, is now commonly termed level-off D.P. cellulose in accordance with the paper by O. A. Battista, "Hydrolysis and Crystallization of Cellulose," vol. 42, Industrial and Engineering Chemistry, 502–7 (1950). Although hydrolysis may be effected by various specific methods, the most direct method free of secondary reactions is the treatment of the cellulosic material with hydrochloric acid. The cellulose resulting from the hydrolysis action of the acid on the cellulosic material reaches with time a substantially constant molecular weight. The level-off D.P. cellulose is dependent primarily upon the initial cellulosic material and to a lesser extent upon the severity of the hydrolyzing conditions. In general, the level-off D.P. of native fibers is in the range of between about 200 and 300 whereas that derived from regenerated cellulose lies in the range of from about 25 to about 60. So far as is known, the level-off D.P. cellulose has been used merely in the study of the fine structure of cellulose and has found no utility in the arts.

The principal purpose of the present invention is to provide level-off D.P. cellulose products for use in the manufacture of various articles.

Another purpose of the present invention is to provide a method for producing level-off D.P. cellulose products adapted for a variety of uses.

Still another object is to produce cellulose crystallites having a high degree of perfection as characterized by X-ray diffraction and also an unusually high level of chemical purity.

Other objects and advantages of the invention will become apparent from the following description and the claims.

The present invention is based upon the discovery that crystallites of level-off D.P. cellulose may be mechanically disintegrated in an aqueous medium at a sufficiently high consistency or concentration to fracture the aggregates of crystals into smaller fragments which form highly useful products.

Any form of purified cellulose, either native or regenerated, may be reduced to a level-off D.P. product by hydrolysis. Purified forms of native cellulose include such materials as cotton fibers, cotton linters, purified wood pulp and the like while specific examples of regenerated cellulose include viscose rayon fibers and filaments and non-fibrous sheet forms such as cellophane. The regenerated cellulose raw materials may be viscose rayon waste or scrap and waste or scrap cellophane either with or without any of the numerous types of coatings conventionally applied to filaments, yarns and cellophane. Although the cellulose may be hydrolyzed by various means, such as hydrochloric acid and ferric chloride, sulfuric acid and the like, it is preferred for the purposes of the present invention to employ hydrochloric acid because a pure hydrocellulose product is required for the purposes of this invention. It is also known that the hydrolysis may be either drastic or mild. For the purposes of the present invention, the drastic hydrolysis which is effected by subjecting the cellulose to a 2.5 normal solution of hydrochloric acid at the boiling point of the solution (about 105° C.) for 15 minutes is preferred; however, mild hydrolysis for an extended time will result in crystalline aggregates having the same characteristics. Since the cellulosic raw material is either a purified native cellulose or regenerated cellulose, the amount of inorganic impurity is extremely low. The drastic hydrolysis effectively removes further amounts of non-cellulosic substances and, in the subsequent processing, substantially all inorganic impurities are removed by solution in the hydrolyzing acid so that the resulting level-off D.P. crystallites are substantially pure and are perhaps the purest form of cellulose obtainable. It is known that subjecting the cellulose raw material to boiling 2.5 normal hydrochloric acid for about 15 minutes removes impurities and amorphous material and the residue is substantially of a constant molecular weight or D.P. value.

The recovered cellulose consists essentially of large aggregates or bundles of the so-called crystalline cellulose. This cellulose is separated by filtration and washed free of acid. Preferably, the last wash water may contain a small amount, such as about 1% of ammonium hydroxide to insure the removal of all acid.

It has been discovered that either the wet level-off D.P. cellulose after washing or dried level-off D.P. cellulose may be mechanically disintegrated in an aqueous medium to form a thixotropic gel. The level-off D.P. cellulose stirred in water, for example, in a 5% concentration, settles much like fine sand when stirred in water. By vigorous mechanical agitation whereby the aggregates or bundles of crystals are broken up to form much smaller particles, some of which are about one micron or less in size results in the formation of what appears to be a colloidal dispersion and depending upon the centration of the cellulose crystallites less than 5 microns, may be a thixotropic gel when the concentration is as low as about 3%, by weight, of the level-off D.P. cellulose. The film-forming and thixotropic characteristics of the colloidal crystalline dispersion improve in proportion to the amount of material of about one micron or less in size produced during the mechanical disintegration step. For example, a 5% dispersion of one sample which exhibited thixotropic properties was found to contain about 1% of the total cellulose particles whose dimensions were less than one micron.

As the mixing and mechanical disintegration of the aggregates continues, there is a progressive increase in the thickness or viscosity of the colloidal gel dispersion. In general, a one hour period of the vigorous mixing as in a Waring Blendor produces optimum viscosities. With further prolonged agitation, the increase in viscosity is very small unless increasing amounts of material under one micron are produced. The viscosity of the colloidal dispersion also increases with an increase in the pH of the aqueous medium. As the pH is increased from 7 to about 10, the viscosity increases, the maximum increase being noted between pH 7 to pH 8 and a maximum viscosity is formed at a pH of about 10. The viscosity drops quite sharply as the pH is increased from 10 to 11.

Some separation of the particles may be effected by diluting the dispersion to about 1%. At this concentration, after standing, the larger particles will settle into a lower layer of liquid while the smaller particles of the order of one micron or less will be distributed throughout the dispersion. The upper layer of liquid containing the smaller sized particles when applied to a surface, for example, to a glass sheet, dries to form a clear, colorless, extremely adherent continuous film. This film can be removed either by scraping with a sharp instrument or by the use of hot water. The unfractionated dispersion comprising all of the particles, when applied to glass, likewise forms an extremely adherent film but because of the great number of particles larger than one micron, the effect is to form a film resembling frosted glass. Glass having a coating or film of level-off D.P. cellulose is claimed in the copending application of Orlando A. Battista Serial No. 636,639, filed January 28, 1957.

The production of the dispersions may be illustrated by the following specific examples.

Example I

Viscose rayon filaments were subjected to a boiling 2.5 normal solution of hydrochloric acid for about 15 minutes. The residue was separated by filtration and washed with water until neutral. At the end of the washing period, the residue was washed with a 1% ammonium hydroxide solution to insure complete neutralization of all acid. The recovered cellulose was then air dried overnight. It was found to have a level-off D.P. of about 40.

The air dried product was added to water to form mixtures containing 5%, 7%, 9% and 10% of the dried cellulose, respectively, and the aggregates in the various mixtures were broken up. Thixotropic gels were formed by subjecting the various mixtures to the action of a Waring Blendor for about one hour. They were white and highly opaque in appearance.

Small portions of the thixotropic gels were diluted with additional amounts of water while being agitated so as to form suspensions or dispersions containing about 1% cellulose. After standing for about one hour, the larger particles settled into a lower liquid layer while the upper liquid layer assumed a somewhat opalescent appearance. The larger particles did not settle into a distinct layer at the bottom of the container but appeared to remain suspended in a layer of liquid constituting about one-third of the total volume. There did not appear to be a sharp boundary between the layers and there was a gradual change in appearance from the milk-like lower layer to the opalescent upper layer which constituted about one-half of the total volume. Particle size measurement of the cellulose suspended in the upper opalescent layer indicate that the maximum particle size did not exceed about one micron with some particles less than about 0.5 micron.

Example II

Cotton linters pulp of normal viscose grade was treated with a boiling, 2.5 normal hydrochloric acid solution for 15 minutes. Water was added, the liquid stirred and filtered to recover the cellulose. The cellulose was then washed with additional quantities of water until substantially neutral and washing completed with a 1% aqueous solution of ammonium hydroxide. The cellulose was then vacuum dried for about 16 hours at 60° C. with a vacuum of about 29 inches. The level-off D.P. was found to be about 200.

A thixotropic gel dispersion was formed by subjecting the cellulose in a 5% concentration in water to the action of a Waring Blendor for about one hour. More viscous gels were also formed in concentrations up to about 10%.

Example III

Purified wood pulp was steeped in an 18% caustic soda solution at room temperature and the excess caustic solution pressed out to a pressed factor of approximately 3. The resulting alkali cellulose was then subjected directly to a 2.5 normal solution of hydrochloric acid at 105° C. for about 15 minutes. The cellulose was then washed with water and washing completed with a 1% ammonium hydroxide solution. The level-off D.P. was found to be about 80. The cellulose without drying was then subjected to the action of a Waring Blendor at a 5% concentation. After about one-half agitation, a thixotropic gel behavior was exhibited.

Example IV

Cellulose was hydrolyzed by subjecting it to a boiling 2.5 normal solution of hydrochloric acid for about 15 minutes. The residue was washed as described above and after draining was stirred in methanol, filtered and air dried at room temperature. The air dried material was added to water to form a 5% concentration and was subjected to the action of a Waring Blendor for about one hour. The thixotropic gel formed from this source of cellulose is considerably clearer and more translucent in appearance than the white milk-like appearance of the preceding examples. The level-off D.P. was found to be about 50.

Example V

Viscose-grade cotton linters were subjected to a boiling 2.5 normal solution of hydrochloric acid for about 15 minutes, washed with water and ammonium hydroxide solution, rinsed in methanol and air dried. Samples of the dried leveled-off D.P. cellulose were added to water to form mixtures containing 5% of the cellulose. The several samples were then agitated in a Waring Blendor for about one hour, the aqueous media varying in pH. The pH of each mixture was adjusted to a desired value by the addition of ammonium hydroxide where necessary. Viscosity measurements were made on each of the dispersions by timing the flow in seconds of a 10 cc. portion in a S–400 Ostwald-type viscometer. The results were as follows:

| Sample | pH | Average Viscosity |
|---|---|---|
| A | 7 | 8.8 |
| B | 8 | 93.4 |
| C | 9 | 118.2 |
| D | 10 | 148.8 |
| E | 11 | 61.1 |

It will be noted that the viscosity increases to a maximum at a pH of about 10 and drops off quite rapidly as the pH is increased beyond 10.

It also will be noted that the drying of the level-off D.P. cellulose samples was accomplished either by drying in a vacuum or by drying in air at room temperatures. In the absence of vacuum, care must be exercised in drying and in no event should the temperature of drying exceed about 100° C. and preferably not over about 60° C. Drying at normal atmospheric pressures, as in oven drying, where temperatures of the order of 105° C. are normally maintained results in a hornified-type product which cannot be broken down to the small particle sizes necessary to produce stable dispersions. Spray drying at low temperatures either in air or a vacuum is also satisfactory. Drying may be effected either on the level-off D.P. cellulose as recovered from the hydrolysis treatment or on the broken-up cellulose resulting from the mechanical disintegration of the level-off D.P. cellulose in an aqueous medium. The spray drying of the disintegrated cellulose may be illustrated by the following example:

Example VI

Viscose rayon fibers were subjected to a boiling 2.5 normal solution of hydrochloric acid for about 15 minutes. The residue was separated by filtration, washed and rinsed as in Example I. The recovered level-off D.P. cellulose, without drying, was then spray dried in a partial vacuum with the liquid being at a temperature of about 50° to about 60° C. when sprayed. The dried powder obtained was subsequently added to water to form a mixture containing about 5% cellulose and upon vigorous agitation formed a thixotropic gel.

The foregoing specific examples illustrate the disintegration of the aggregates or bundles of crystals under substantially neutral or alkaline conditions. This disintegration may be accomplished in aqueous media having an acid pH, however, thixotropic gels and stable suspensions can only be obtained if the aqueous media are neutral or have an alkaline pH. The fracturing of the aggregates may be effected at an acid pH and upon increasing the pH to the alkaline side, a thixotropic gel or a stable suspension is formed depending upon the concentration of the cellulose in the mixture. This action may be illustrated by the following example:

*Example VII*

Cotton linters pulp of normal viscose grade was subjected to the action of a boiling, 2.5 normal hydrochloric acid solution for 15 minutes. At the end of this treatment, the level-off D.P. hydrocellulose was separated from the liquid by filtration on a fritted glass filter element and the excell hydrochloric acid solution removed by suction. The cellulose crystallites, containing excess acid, were dispersed in water at about 5% consistency and the mixture subjected to the action of a Waring Blendor at a pH of about 1 for about 30 minutes. Upon standing, substantially all of the cellulose settled out. After redispersing the cellulose and adjusting the pH to between 7 and 8, a thixotropic gel is formed. In the case of dilute mixtures (1% and 2% cellulose), settling of the particles likewise occurred at acid pH's however, stable dispersions formed upon raising the pH to an alkaline pH and agitating the mixtures.

It has also been discovered that although the cellulose may have the proper structure to form the dispersions when vigorously agitated in an aqueous medium, a mechanical milling or grinding of the dry level-off D.P. cellulose does not reduce the powder to a condition whereby dispersions may be formed by agitation of the ground powder in water. It is essential that the level-off D.P. cellulose be subjected to a vigorous mechanical disintegration in an aqueous medium.

The use of acids other than hydrochloric acid for the hydrolysis treatment of the cellulose have been considered. Hydrochloric acid, however, is preferred because its action is rapid and provides a specific splitting of the 1,4 glycosidic bonds and produces crystallites of substantially 100% purity that are readily washed free of acids and any other inorganic material which might be present. Furthermore, the yields of level-off D.P. cellulose usable for the production of the stable dispersions are appreciably higher than the yields obtained when other acids are employed. For example, when sulfuric acid is employed in the hydrolysis treatment, the yield is as much as 30% lower than the yield obtained by the use of hydrochloric acid under comparable conditions. Furthermore, sulfuric acid is less desirable than hydrochloric acid because it tends to produce sulfated cellulose crystallites and as high as 2% sulfur is introduced into the cellulose. The sulfated cellulose crystallites become peptized and render the product exceedingly difficult to free of excess acid.

While preferred embodiments of the invention have been shown and described, it is to be understood that changes and variations may be made without departing from the spirit and scope of the invention as defined in the appended claims.

We claim:

1. As an article of manufacture, a stable dispersion of level-off D.P. cellulose in the form of small disintegrated aggregates of crystals in an aqueous medium having a pH of between substantially neutral and 11 and consisting essentially of water, the stable dispersion being further characterized by forming an extremely adherent film on glass when the dispersion is applied to glass and the applied dispersion is dried.

2. An article of manufacture as defined in claim 1 wherein the aqueous medium has a pH of approximately 8 to 10 and consissts essential of water.

3. As an article of manufacture, a stable dispersion of level-off D.P. cellulose in the form of small disintegrated aggregates of crystals in an aqueous medium having a pH of between substantially neutral and 11 and consisting essentially of water, at least about 1% of the dispersed cellulose having a particle size not exceeding about one micron, the stable dispersion being further characterized by forming an extremely adherent film on glass when the dispersion is applied to glass and the applied dispersion is dried.

4. An article of manufacture as defined in claim 3 wherein the aqueous medium has a pH of between 8 and 10 and consists essentially of water.

5. As an article of manufacture, a stable dispersion of level-off D.P. cellulose in the form of small disintegrated aggregates of crystals having a particle size not exceeding about one micron in an aqueous medium having a pH of between substantially neutral and 11 and consisting essentially of water, the stable dispersion being further characterized by forming a clear, colorless, extremely adherent continuous film on glass when the dispersion is applied to glass and the applied dispersion is dried.

6. An article of manufacture as defined in claim 5 wherein the aqueous medium has a pH between 8 and 10 and consisting essentially of water.

7. As an article of manufacture, a thixotropic gel comprising a dispersion of level-off D.P. cellulose in the form of disintegrated small aggregates of crystals in an aqueous medium, the amount of dispersed cellulose constituting, by weight, at least about 3% of the gel, the aqueous medium having a pH of between substantially neutral and 11 and consisting essentially of water, the thixotropic gel being further characterized by forming an extremely adherent film on glass when the gel is applied to glass and the gel is dried.

8. An article of manufacture as defined in claim 7 wherein at least about 1% of the dispersed small disintegrated aggregates have a particle size not exceeding about one micron.

9. An article of manufacture as defined in claim 7 wherein the aqueous medium has a pH of between 8 and 10 and consists essentially of water.

10. As an article of manufacture, level-off D.P. cellulose in the form of small disintegrated aggregates of crystals, at least about 1% by weight of the aggregates having a particle size not exceeding about one micron, the mass of small aggregates being further characterized in forming a stable dispersion in an aqueous medium having a pH of between substantially neutral and 11 and consisting essentially of water which dispersion when applied to glass and the dispersion dried form an extremely adherent film on the glass.

11. A method of forming a stable dispersion of level-off D.P. cellulose in an aqueous medium which comprises hydrolyzing cellulose in an acid medium containing as its acidic constituent an acid of the group consisting of hydrochloric acid and sulfuric acid to form level-off D.P. cellulose, washing the level-off D.P. cellulose with an aqueous medium to free the cellulose of acid and subjecting the acid-free level-off D.P. cellulose to mechanical disintegration in an aqueous medium to form disintegrated aggregates of cellulose crystallites, adjusting the pH of the medium to a pH of between substantially neutral and 11 to form a stable dispersion, the stable dispersion being further characterized by forming an extremely adherent film on glass when the dispersion is applied to glass and the applied dispersion is dried.

12. A method as defined in claim 11 wherein the hydrolyzing acid medium is an aqueous solution of hydrochloric acid.

13. A method as defined in claim 11 wherein the level-off D.P. cellulose is subjected to mechanical disintegration in an aqueous medium having a pH of between substantially neutral and about 11 and consists essentially of water.

14. A method of forming a water-dispersible level-off D.P. cellulose powder which comprises hydrolyzing cellulose in an acid medium containing as its acidic constituent an acid of the group consisting of hydrochloric acid and sulfuric acid to form level-off D.P. cellulose, washing the level-off D.P. cellulose with an aqueous medium to free the cellulose of acid, subjecting the acid-free level-off D.P. cellulose to mechanical disintegration in an aqueous medium having a pH of between substantially neutral and 11 and consisting essentially of water to form disintegrated aggregates of cellulose crystallites and drying the disintegrated level-off D.P. cellulose at a temperature below 100° C., the level-off D.P. cellulose powder being further characterized in forming a stable dispersion in an aqueous medium having a pH between substantially neutral and 11 and consisting essentially of water, which dispersion when applied to glass and the dispersion dried forms an extremely adherent film on the glass.

15. A method of forming a stable dispersion of level-off D.P. cellulose in an aqueous medium which comprises adding to and mixing with an aqueous medium dried level-off D.P. cellulose in the form of small disintegrated aggregates of crystals, at least about 1% by weight of the aggregates having a particle size not exceeding about one micron, the aqueous medium having a pH of between substantially neutral and 11 and consisting essentially of water, the stable dispersion being further characterized by forming an extremely adherent film on glass when the dispersion is applied to glass and the applied dispersion is dried.

References Cited in the file of this patent

UNITED STATES PATENTS

| | | |
|---|---|---|
| 1,869,040 | Bassett | July 26, 1932 |
| 2,096,743 | Henkels | Oct. 26, 1937 |
| 2,335,126 | Lilienfeld | Nov. 23, 1943 |

OTHER REFERENCES

Journal of Polymer Science, vol. X, No. 6, pp. 577–586.
Textile Research Journal, vol. XXV, No. 6, June 1955, pp. 534–540.